United States Patent
Aikoh

(10) Patent No.: US 10,523,909 B2
(45) Date of Patent: Dec. 31, 2019

(54) IMAGE DISPLAY APPARATUS, LIGHT SOURCE APPARATUS, AND IMAGE DISPLAY METHOD

(71) Applicant: SONY CORPORATION, Tokyo (JP)

(72) Inventor: Yoshihisa Aikoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 105 days.

(21) Appl. No.: 15/534,107

(22) PCT Filed: Oct. 26, 2015

(86) PCT No.: PCT/JP2015/005361
§ 371 (c)(1),
(2) Date: Jun. 8, 2017

(87) PCT Pub. No.: WO2016/103545
PCT Pub. Date: Jun. 30, 2016

(65) Prior Publication Data
US 2017/0347074 A1    Nov. 30, 2017

(30) Foreign Application Priority Data
Dec. 24, 2014    (JP) .................................. 2014-259739

(51) Int. Cl.
*H04N 9/31*    (2006.01)
*G02B 27/14*    (2006.01)
(Continued)

(52) U.S. Cl.
CPC ......... *H04N 9/3161* (2013.01); *G02B 27/141* (2013.01); *G03B 21/2033* (2013.01);
(Continued)

(58) Field of Classification Search
CPC .................................................. H04N 9/3161
See application file for complete search history.

(56) References Cited

U.S. PATENT DOCUMENTS
2010/0328633 A1    12/2010    Sato et al.

FOREIGN PATENT DOCUMENTS
CN    101937163 A    1/2011
JP    2005-284185 A    10/2005
(Continued)

OTHER PUBLICATIONS
International Search Report and Written Opinion of PCT Application No. PCT/JP2015/005361, dated Jan. 19, 2016, 01 pages of English Translation and 09 pages of ISRWO.

*Primary Examiner* — Jefferey F Harold
*Assistant Examiner* — Justin B Sanders
(74) *Attorney, Agent, or Firm* — Chip Law Group

(57) ABSTRACT

An image display apparatus includes an image generation element generating an image on the basis of incident light, an illumination optical system having an irradiated surface and guiding light applied to the irradiated surface into the image generation element, the irradiated surface including a plurality of divided areas. A light source system includes a plurality of light source units corresponding to the plurality of divided areas, and a light guiding optical system, the plurality of light source units emitting emitted light to corresponding divided areas. Further, at least one of the plurality of light source units is arranged so that the emitted light passes through space opposed to at least one different divided area, the at least one different divided area being different from the divided area to be irradiated with the emitted light.

13 Claims, 14 Drawing Sheets

(51) Int. Cl.
    *G03B 21/20*         (2006.01)
    *G03B 33/06*         (2006.01)
    *G03B 21/16*         (2006.01)

(52) U.S. Cl.
    CPC ......... *G03B 21/2066* (2013.01); *G03B 33/06* (2013.01); *H04N 9/3158* (2013.01); *H04N 9/3164* (2013.01); *G03B 21/16* (2013.01); *G03B 21/204* (2013.01); *G03B 21/2073* (2013.01)

(56) References Cited

FOREIGN PATENT DOCUMENTS

| | | | | | |
|---|---|---|---|---|---|
| JP | 2009-204871 | A | | 9/2009 | |
| JP | 2009204871 | A | * | 9/2009 | ................ F21S 2/00 |
| JP | 2010-073517 | A | | 4/2010 | |
| JP | 2011-013317 | A | | 1/2011 | |
| JP | 2011-13317 | A | | 1/2011 | |
| JP | 2012-123179 | A | | 6/2012 | |

* cited by examiner

IMAGE DISPLAY APPARATUS, LIGHT SOURCE APPARATUS, AND IMAGE DISPLAY METHOD

CROSS REFERENCE TO RELATED APPLICATIONS

This application is a U.S. National Phase of International Patent Application No. PCT/JP2015/005361 filed on Oct. 26, 2015, which claims priority benefit of Japanese Patent Application No. JP 2014-259739 filed in the Japan Patent Office on Dec. 24, 2014. Each of the above-referenced applications is hereby incorporated herein by reference in its entirety.

TECHNICAL FIELD

The present technology relates to an image display apparatus such as a projector, a light source apparatus used therefor, and an image display method.

BACKGROUND ART

Conventionally, image display apparatuses such as projectors have been widely used. For example, light from light sources is modulated by a light modulator such as a liquid-crystal device and the modulated light is projected to a screen or the like, such that an image is displayed. Mercury-vapor lamps, xenon lamps, LEDs (Light Emitting Diodes), LDs (Laser Diodes), and the like are used as the light sources.

Patent Literature 1 has disclosed a projector including three or more light sources for brightening a projected image. In this projector, a pyramid-shaped reflection member is arranged at the center of a plurality of lamps. The number of sides of the pyramid-shaped reflection member corresponds to the number of lamps (light sources). Then, illumination light emitted from each lamp is reflected in the direction of a light modulation device by the corresponding side of the reflection member. Accordingly, it is possible to convert the illumination light from each light source into parallel light having many overlapping parts of light fluxes, and reduce the light amount loss. Further, even in the case where the number of lamps is increased, it is possible to prevent an optical system from being increased in size because the number of sides of the reflection member only needs to be increased (paragraphs 0038 to 0040 of the specification of Patent Literature 1).

CITATION LIST

Patent Literature

Patent Literature 1: Japanese Patent Application Laid-open No. 2010-73517

DISCLOSURE OF INVENTION

Technical Problem

In the case where a plurality of light source units are used for increasing the luminance of the projector as described in Patent Literature 1, it is important to achieve size reduction of the apparatus.

In view of the circumstances as described above, it is an object of the present technology to provide a small-sized image display apparatus including a plurality of light source units, a light source apparatus that can be applied thereto, and an image display method.

Solution to Problem

In order to achieve the above-mentioned object, an image display apparatus according to an embodiment of the present technology includes an image generation system and a light source system.

The image generation system includes an image generation element and an illumination optical system, the image generation element generating an image on the basis of incident light, the illumination optical system having an irradiated surface and guiding light applied to the irradiated surface into the image generation element, the irradiated surface including a plurality of divided areas.

The light source system includes a plurality of light source units corresponding to the plurality of divided areas, and a light guiding optical system, the plurality of light source units emitting emitted light to corresponding divided areas, the light guiding optical system guiding the emitted light into a divided area to be irradiated with the emitted light.

Further, at least one of the plurality of light source units is arranged so that the emitted light passes through space opposed to at least one different divided area, the at least one different divided area being different from the divided area to be irradiated with the emitted light.

In this image display apparatus, the plurality of light source units are arranged corresponding to the plurality of divided areas of the irradiated surface. Further, the at least one light source unit is arranged so that emitted light passes through the space opposed to the at least one different divided area. As a result, it is possible to arrange the plurality of light source units to come close to each other, and achieve size reduction of the image display apparatus.

The light guiding optical system may guide emitted light that is emitted from the at least one of the plurality of light source units and passes through the space opposed to the at least one different divided area into the divided area to be irradiated with the emitted light.

Accordingly, it is possible to achieve size reduction of the image display apparatus.

The plurality of light source units may each have an emission surface, the emitted light being emitted from the emission surface. In this case, the at least one of the plurality of light source units may be arranged so that the emission surface is included in the space opposed to the at least one different divided area.

Accordingly, it is possible to reduce the distance between the light source units, and achieve size reduction of the image display apparatus.

The plurality of light source units may include one or more light source units arranged at a first height and one or more light source units arranged at a second height different from the first height, a direction of a normal of the irradiated surface being a height direction.

Accordingly, it is possible to arrange the plurality of light source units to come close to each other, and achieve size reduction of the image display apparatus.

The at least one of the plurality of light source units may be arranged so that emitted light of the at least one of the plurality of light source units and emitted light of a different light source unit of the plurality of light source units intersect with each other.

Accordingly, it is possible to achieve size reduction of the image display apparatus.

The plurality of divided areas may include four divided areas arranged along a first direction and a second direction orthogonal to the first direction around a predetermined point on the irradiated surface. In this case, the plurality of light source units may include two light source units arranged at the first height and two light source units arranged at the second height, the two light source units arranged at the first height emitting the emitted light in orientations opposed to each other along the first direction, the two light source units arranged at the second height emitting the emitted light in orientations opposed to each other along the second direction.

With such arrangement, it is possible to easily achieve size reduction of the image display apparatus.

The four divided areas may include a first divided area, a second divided area adjacent to the first divided area in the second direction, a third divided area adjacent to the second divided area in the first direction, and a fourth divided area adjacent to the third divided area in the second direction and to the first divided area in the first direction.

In this case, the two light source units arranged at the first height may include a first light source unit and a third light source unit, the first light source unit being arranged so that the emitted light passes through space opposed to the fourth divided area, the third light source unit being arranged so that the emitted light passes through space opposed to the second divided area.

Further, the two light source units arranged at the second height may include a second light source unit and a fourth light source unit, the second light source unit being arranged so that the emitted light passes through space opposed to the first divided area, the fourth light source unit being arranged so that the emitted light passes through space opposed to the third divided area.

With such arrangement, it is possible to easily achieve size reduction of the image display apparatus.

The second height may be higher than the first height. In this case, the second light source unit may be arranged so that the emission surface is included in the space opposed to the first divided area. Further, the fourth light source unit may be arranged so that the emission surface is included in the space opposed to the third divided area.

With such arrangement, it is possible to easily achieve size reduction of the image display apparatus.

The light source system may include an auxiliary light source that emits light of a predetermined color as auxiliary light. In this case, the light guiding optical system may guide the auxiliary light from the auxiliary light source into the irradiated surface.

Accordingly, it is possible to adjust the range (gamut) in which the color can be reproduced, and generate an image with a high quality.

The irradiated surface may be an incident surface of a fly eye lens of the illumination optical system.

With the plurality of light source units, it is possible to cause light with a high luminance to enter the incident surface of a fly eye lens.

The plurality of light source units may each include one or more laser light sources.

By using a laser light source, it is possible to achieve tilt-free.

A light source apparatus according to an embodiment of the present technology includes a plurality of light source units and a light guiding optical system.

The plurality of light source units correspond to a plurality of divided areas obtained by dividing an irradiated surface into a plurality of areas, the plurality of light source units being arranged so that emitted light passes through space opposed to at least one different divided area, the at least one different divided area being different from a divided area to be irradiated with the emitted light.

The light guiding optical system guides emitted light that is emitted from each of the plurality of light source units and passes through the space opposed to at least one different divided area into the divided area to be irradiated with the emitted light.

Accordingly, it is possible to achieve a small-sized light source apparatus that is capable of emitting emitted light to respective divided areas of the irradiated surface.

An image display method according to an embodiment of the present technology includes arranging a plurality of light source apparatuses corresponding to a plurality of divided areas obtained by dividing an irradiated surface into a plurality of areas so that emitted light passes through space opposed to at least one different divided area, the at least one different divided area being different from a divided area to be irradiated with the emitted light.

By a light guiding optical system, emitted light that is emitted from each of the plurality of light source units and passes through the space opposed to the at least one different divided area is guided into the divided area to be irradiated with the emitted light; and By an illumination optical system, light applied to each of the plurality of divided areas is guided into an image generation element to generate an image by the image generation element.

Advantageous Effects of Invention

As described above, in accordance with the present technology, it is possible to achieve size reduction of an image display apparatus including a plurality of light source units. It should be noted that the effects described here are not necessarily limitative and may be any effect described in the present disclosure.

MODE(S) FOR CARRYING OUT THE INVENTION

Hereinafter, embodiments according to the present technology will be described with reference to the drawings.

[Image Display Apparatus]

Figure 1:
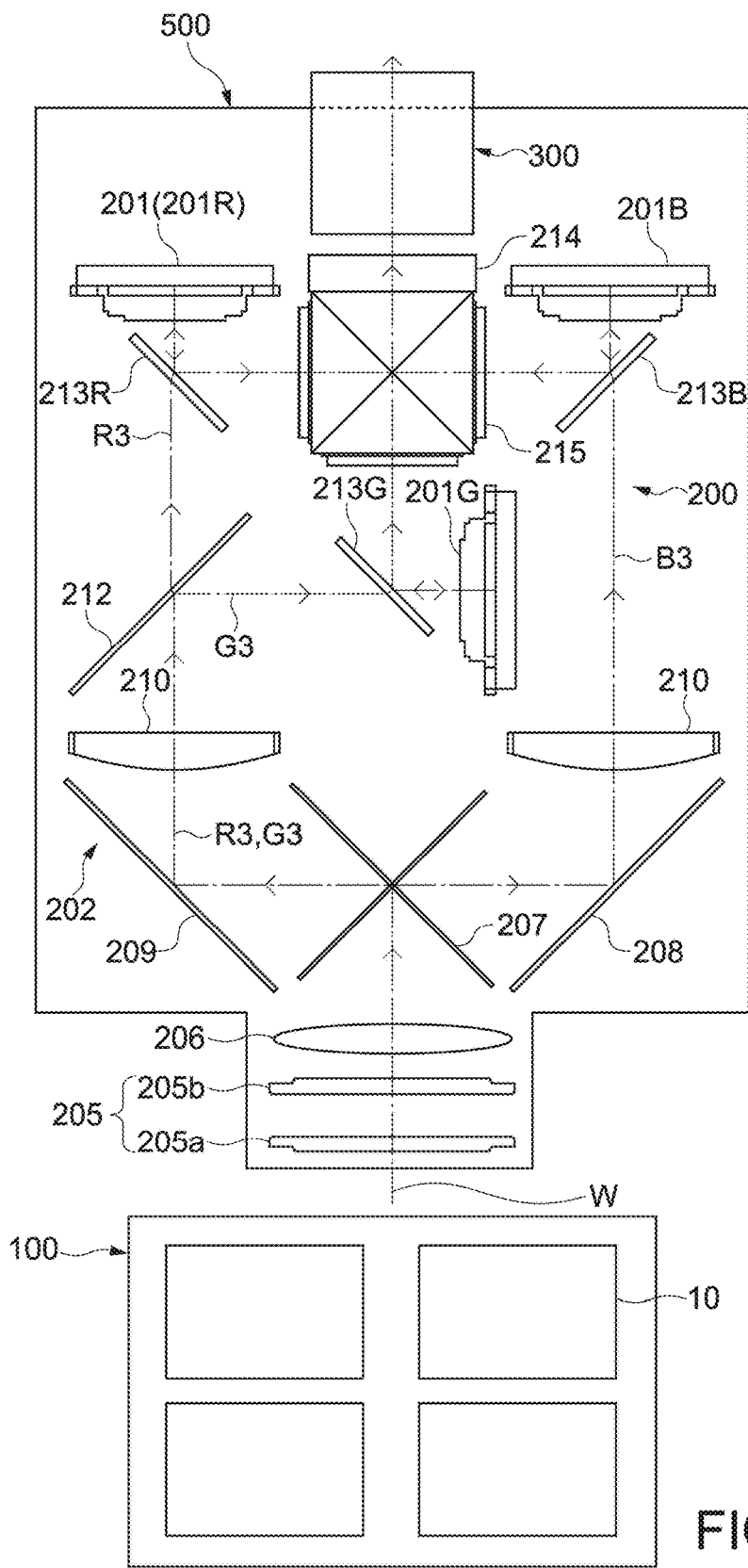
FIG. 1 A schematic diagram showing a configuration example of an image display apparatus according to an embodiment.

FIG. 1 is a schematic diagram showing a configuration example of an image display apparatus according to an embodiment of the present technology. An image display apparatus 500 is used as a projector for presentation or digital cinema, for example. The present technology described below is also applicable to image display apparatuses used for the other purposes.

The image display apparatus 500 includes a light source system 100, an image generation system 200, and a projection system 300. The light source system 100 emits light. The image generation system 200 generates an image, using light from the light source system 100. The projection system 300 projects the image generated by the image generation system 200 to a screen (not shown) or the like.

The light source system 100 emits white light W including red light, green light, and blue light (light of RGB colors). The light source system 100 according to this embodiment includes four light source units 10. Each light source unit 10 generates white light and emits the white light. By using a plurality of light source units 10, it is possible to improve the luminance of a displayed image. The configuration, arrangement, and the like of each light source unit 10 will be described later in detail.

The image generation system 200 includes a reflective liquid-crystal light bulb (image generation element) 201 that generates an image on the basis of the incident light and an illumination optical system 202 that introduces light into the image generation element. Further, the illumination optical system 202 has an irradiated surface 203 to be irradiated with the white light W, divides the white light applied to the irradiated surface 203 into light of respective colors, and introduces the divided light into the image generation element 201.

As shown in FIG. 1, the illumination optical system 202 includes an integrator element 205 and a condenser lens 206. The integrator element 205 includes first fly eye lens 205a including a plurality of micro lenses two-dimensionally arranged and a second fly eye lens 205b including a plurality of micro lenses arranged corresponding to the micro lenses one by one.

The white light W entering the integrator element 205 from the light source system 100 is divided by the micro lenses of the first fly eye lens 205a into a plurality of light fluxes and forms an image on each of the corresponding micro lenses in the second fly eye lens 205b.

Each of the micro lenses of the second fly eye lens 205b functions as a secondary light source. A plurality of parallel light beams having the same luminance are applied to the condenser lens 206. Therefore, in this embodiment, the incident surface of the first fly eye lens 205a (lens valid range) is the irradiated surface 203 of the illumination optical system 202.

The integrator element 205 functions, as a whole, to adjust the white light W, which is applied from the light source system 100 to the condenser lens 206, to have uniform luminance distribution.

Further, the illumination optical system 202 includes a first dichroic mirror 207, two reflection mirrors 208 and 209, two light collection lenses 210 and 211, and a second dichroic mirror 212. Further, the illumination optical system 202 includes reflective polarization elements 213R, 213G, and 213B, reflective liquid-crystal light bulbs 201R, 201G, and 201B, and a dichroic prism 214.

The first dichroic mirror 207 divides the white light W emitted from the condenser lens 206 into blue light B3 on the short wavelength side and red light R3 and green light G3 on the long wavelength side. The blue light B3 divided by the first dichroic mirror 207 is reflected by the first reflection mirror 208, and enters the first light collection lens 210. Then, the blue light B3 collected by the first light collection lens 210 enters the liquid-crystal light bulb 201B via the reflective polarization element 213B. As the reflective polarization element 213B, a prism-type beam splitter, a wire grid polarizer, or the like is used.

The red light R3 and the green light G3 divided by the first dichroic mirror 207 are reflected by the second reflection mirror 209, and enter the second light collection lens 211. Then, the red light R3 and the green light G3 collected by the second light collection lens 211 are emitted to the second dichroic mirror 212.

The second dichroic mirror 212 divides the red light R3 and the green light G3 into the green light G3 on the short wave side and the red light R3 on the long wavelength side. The divided red light R3 enters the liquid-crystal light bulb 201R via the reflective polarization element 213R. The green light G3 enters the liquid-crystal light bulb 201G via the reflective polarization element 213G.

The liquid-crystal light bulbs 201R, 201G, and 201B are electrically connected to a signal source (not shown) (e.g., PC) that supplies an image signal including image information. The liquid-crystal light bulbs 201R, 201G, and 201B modulate, on the basis of the supplied color image signals, the incident light for each pixel to reflect it. The three modulated image light beams are reflected by the reflective polarization elements 213R, 213G, and 213B, and enter the dichroic prism 214. At this time, by a polarizing plate 215 provided to the dichroic prism 214, modulated color light beams are made to have a uniform polarization direction. Accordingly, the contrast is improved.

The dichroic prism 214 combines three light beams modulated by the liquid-crystal light bulbs 201R, 201G, and 201B on the same light path, and emits it to the projection system 300. The projection system 300 includes a lens (not shown) and the like, magnifies the combined light at a predetermined magnification, and projects it to a screen or the like. Accordingly, a full-color image is displayed.

[Light Source System]

Figure 2:
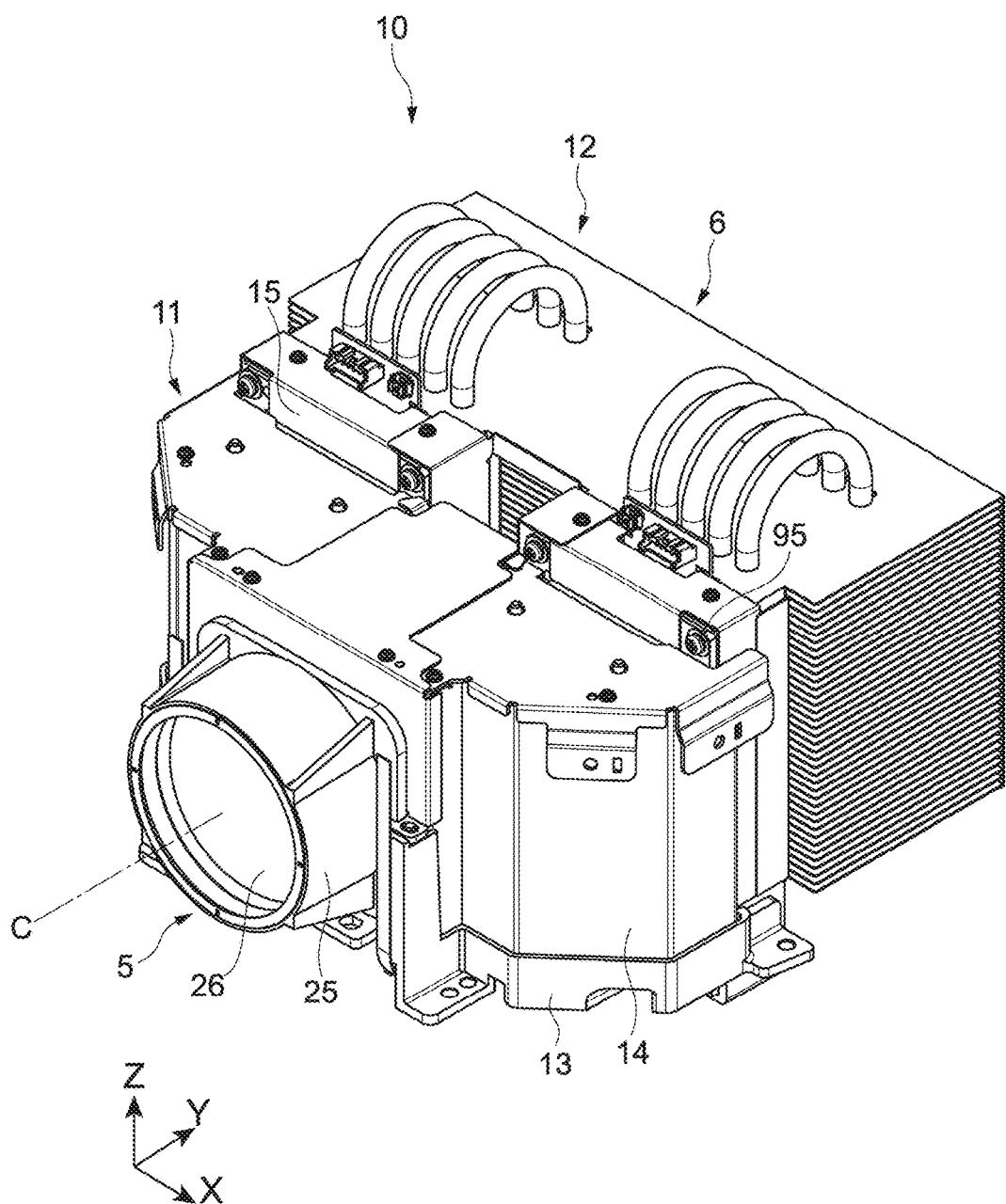
FIG. 2 A perspective view showing a configuration example of a light source unit of a light source system.

FIG. 2 is a perspective view showing a configuration example of the light source unit 10 of the light source system 100. The light source unit 10 includes a light source section 11 that emits white light, and a heat sink 12 that is attached to the light source section 11. Assuming that a side on which the white light is emitted is a front side 5 and an opposite side thereof is a back side 6, the heat sink 12 is attached to the back side 6 of the light source section 11.

The light source section 11 includes a base portion 13 provided in the bottom portion and a housing portion 14 supported by the base portion 13. The base portion 13 has a shape long in one direction. A longitudinal direction of the elongated base portion 13 is left- and right-hand directions (x-axis direction) of the light source unit 10 and a lateral direction orthogonal to the longitudinal direction is front and rear directions (y-axis direction). Further, a direction orthogonal to both of the longitudinal direction and the lateral direction is a height direction (z-axis direction) of the light source unit 10.

A light source module 15 and a phosphor unit 25 are mounted on the base portion 13. The light source module 15 includes one or more laser light sources. The phosphor unit 25 receives light of the light source module 15 and generates and emits white light. Inside the housing portion 14, laser light emitted from the one or more laser light sources is guided to the phosphor unit 25. Then, white light is generated by the phosphor unit 25 and the white light is emitted from an emission surface 26 along an optical axis C.

Figure 3:
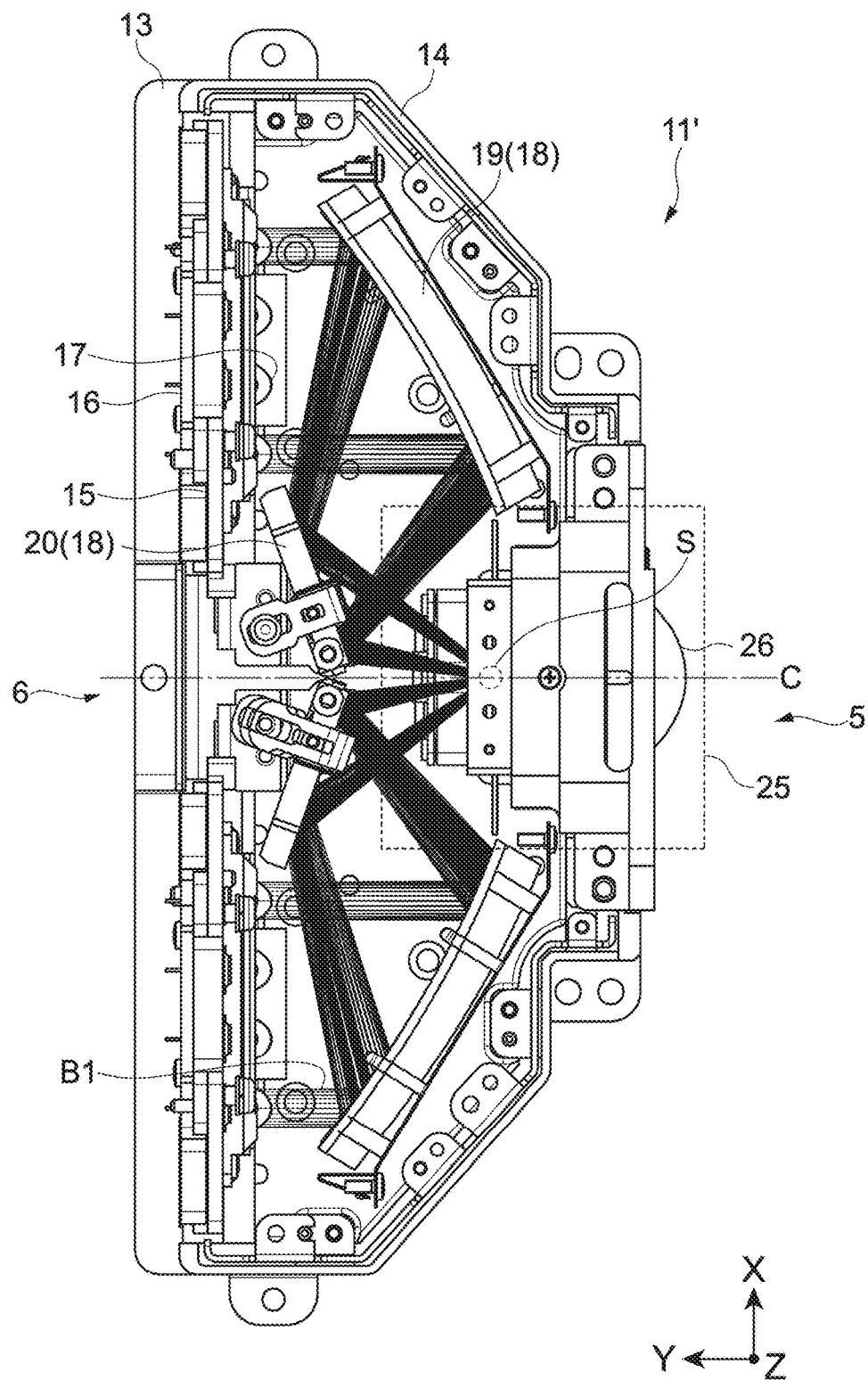
FIG. 3 A plan view of a light source section whose upper surface portion is detached as viewed from the top.
Figure 4:
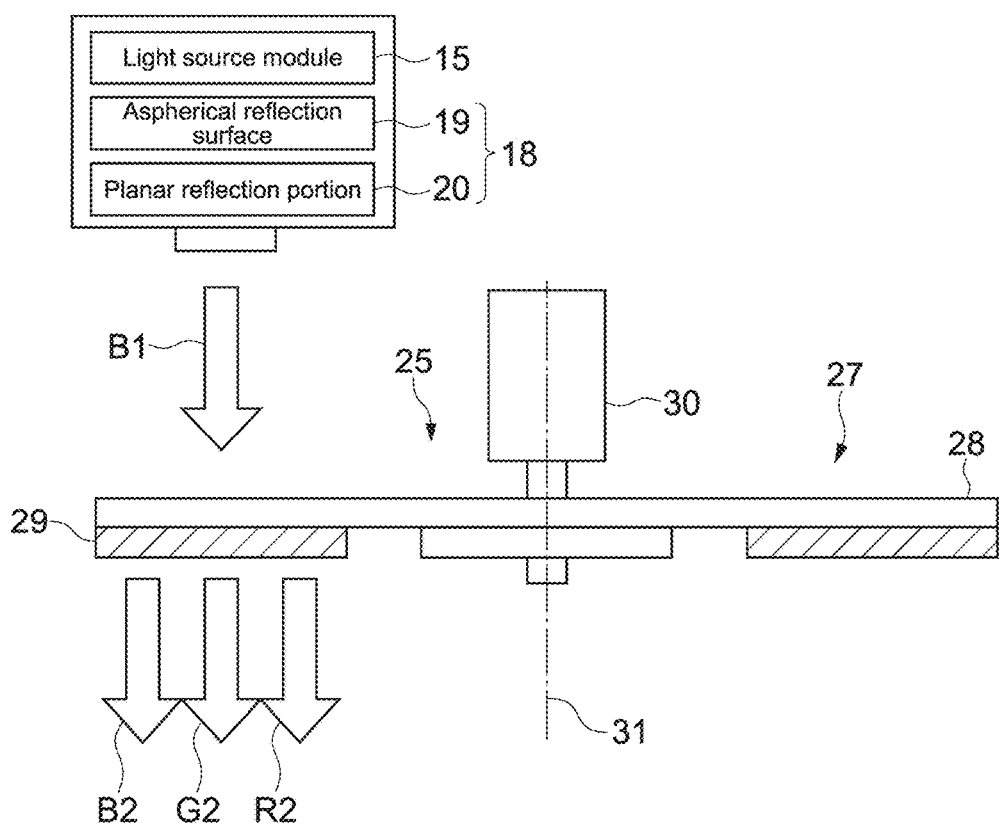
FIG. 4 A view for describing generation of white light by the light source section.

Referring to FIG. 3 and FIG. 4, an internal configuration example of the light source section 11 and a generation example of the white light will be described. In FIG. 3, a light source section 11' in a form slightly different from that of the light source section 11 shown in FIG. 2 is shown. However, the configuration example and generation example to be described below are applicable to the light source section 11 shown in FIG. 2 as they are. Note that, in comparison with the light source section 11 shown in FIG. 2, an outer appearance of the phosphor unit 25 has a shape different from that of a portion supporting a mounting substrate on which the plurality of laser light sources are mounted.

FIG. 3 is a plan view of the light source section 11' section whose upper surface portion is detached as viewed from the top. As shown in FIG. 3, on the back side 6 of the base portion 13, two light source modules 15 are arranged in the longitudinal direction. Each of the light source modules 15 includes a plurality of laser light sources (laser diodes) 17 mounted on a mounting substrate 16. The plurality of laser light sources 17 are arranged to be capable of emitting light toward the front side 5 with the front and rear directions being an optical axis direction.

In this embodiment, the plurality of laser light sources 17 are each a blue-laser light source capable of oscillating blue laser light B1 having a peak wavelength of emission intensity within a wavelength range of 400 nm to 500 nm, for example. The laser light sources may be rearranged by other solid-state light sources such as LEDs. Further, also when the solid-state light sources may be rearranged by mercury-vapor lamps, xenon lamps, or the like, the present technology is applicable.

In front of the two light source modules 15, light collection optical systems 18 are arranged. The light collection optical system 18 collects the blue laser light B1 from the plurality of laser light sources 17 onto a predetermined spot S of the phosphor unit 25. The light source module 15 and the light collection optical system 18 may be supported by a frame (not shown) or the like as a single unit.

As shown in FIG. 3, the light collection optical system 18 includes an aspherical reflection surface 19 and a planar reflection portion 20. The aspherical reflection surface 19 reflects and collects light emitted from the plurality of laser light sources 17. The planar reflection portion 20 collects the light reflected by the aspherical reflection surface 19 to the predetermined spot S of the phosphor unit 20.

As shown in FIG. 3, a direction of the optical axis C of the white light and an optical axis direction of the blue laser light B1 emitted from the plurality of laser light sources 17 are set to be the same direction. This enables a space for the heat sink 12 to be easily ensured on the back side 6 of the light source section 11'. Then, the plurality of laser light sources 17 can be efficiently cooled from the back side 6.

FIG. 4 is a diagram for describing generation of the white light by the light source section 11' and also is a diagram schematically showing a phosphor wheel provided inside the phosphor unit 20.

A phosphor wheel 27 includes a disk-shaped substrate 28 that transmits the blue laser light B1 therethrough and a phosphor layer 29 disposed on the substrate 28. At the center of the substrate 28, a motor 30 that drives the phosphor wheel 27 is connected and the phosphor wheel 27 is provided to be rotatable about a rotation axis 31. The rotation axis 31 is located such that the predetermined spot S of the phosphor layer 29 is positioned at the optical axis C shown in FIG. 2.

The phosphor layer 29 contains a fluorescent substance that is excited by the blue laser light B1 and emits fluorescence. Then, the phosphor layer 29 converts a part of the blue laser light B1 emitted by the plurality of laser light sources 17 into light (i.e., yellow light) in a wavelength region of a red wavelength region to a green wavelength region, and emits the light. As the fluorescent substance contained in the phosphor layer 29, for example, a YAG (Yttrium Aluminum Garnet)-based phosphor is used.

Further, the phosphor layer 29 transmits a part of the excited light therethrough, such that the blue laser light B1 emitted from the plurality of laser light sources 17 can also be emitted. With this, light emitted from the phosphor layer 29 becomes white light due to the mixture of blue excited light and yellow fluorescence.

While the substrate 28 is rotated by the motor 30, the blue laser light B1 is emitted from the laser light source 17. The blue laser light B1 is applied to the phosphor layer 29 in such a manner that it relatively draws a circle correspondingly to the rotation of the substrate 28. With this, the white light including blue laser light B2 that has been transmitted through the phosphor layer 29 and green light G2 and red light R2 that are the visible light from the phosphor layer 29 is emitted from the phosphor unit 20.

A configuration of the light source section 11 is not limited and may be appropriately designed. A configuration of the phosphor unit 20 can also be appropriately designed. Without the phosphor unit 20, laser light sources or the like capable of emitting color laser light beams of RGB may be used and the color laser light beams of RGB may be combined to generate the white light.

Figure 5:
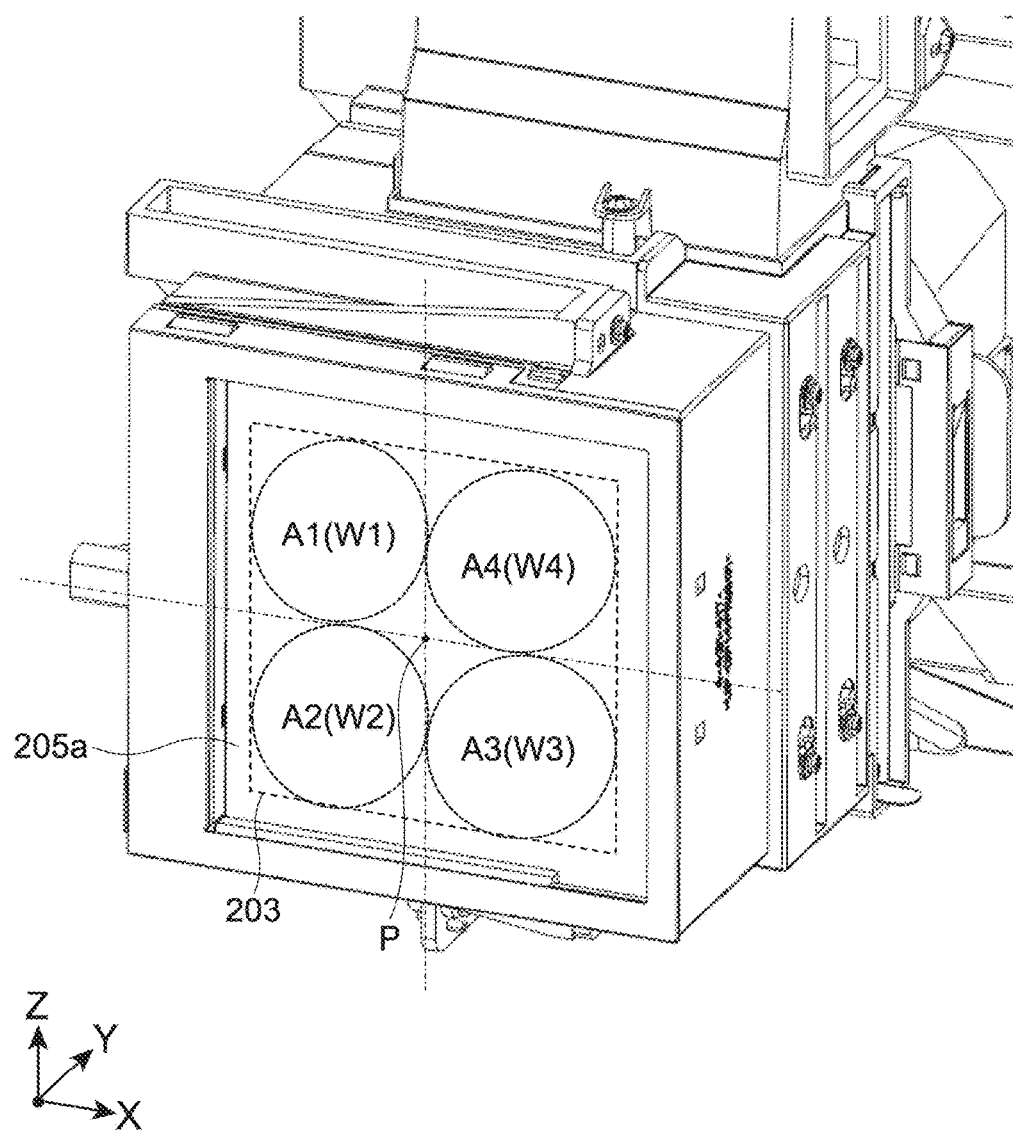
FIG. 5 A perspective view showing an incident surface of a first fly-eye lens to be an irradiated surface.

Next, arrangement of the four light source units 10 will be described. In FIG. 5 and subsequent figures referred to in the following description, xyz-axes that are not related to those shown in FIG. 2 and FIG. 3 is newly set.

FIG. 5 is a perspective view showing the incident surface of the first fly eye lens 205a to be the irradiated surface 203. In this embodiment, four divided areas of a first divided area A1 to a fourth divided area A4 obtained by dividing the irradiated surface 203 into a plurality of areas are set.

The four divided areas A1 to A4 are arranged around a point P substantially at the center of the irradiated surface 203 along an x-axis direction (first direction) and a z-axis direction (second direction) orthogonal to the x-axis direction. The upper left area of the irradiated surface 203 is the first divided area A1. The second divided area A2 is adjacent to the first divided area A1 in the X-axis direction. The third divided area is adjacent to the first divided area A1 in the z-axis direction. The fourth divided area A4 is adjacent to the third divided area A3 in the z-axis direction and the first divided area A1 in the x-axis direction.

Specifically, in this embodiment, the first to fourth divided areas A1 to A4 are set to be adjacent in the clockwise direction around the point P. In other words, the irradiated surface 203 is divided into four quadrants of a first, second, third, and fourth quadrants, and the quadrants respectively correspond to the fourth, first, second, and third divided areas. Note that the position of each divided area is not limited.

As will be described later, four light source units 10a to 10d are arranged corresponding to the first to fourth divided areas A1 to A4, respectively. Then, white lights W1 to W4 respectively emitted from the light source units 10a to 10d are respectively applied to the first to fourth divided areas A1 to A4.

Figure 6A:
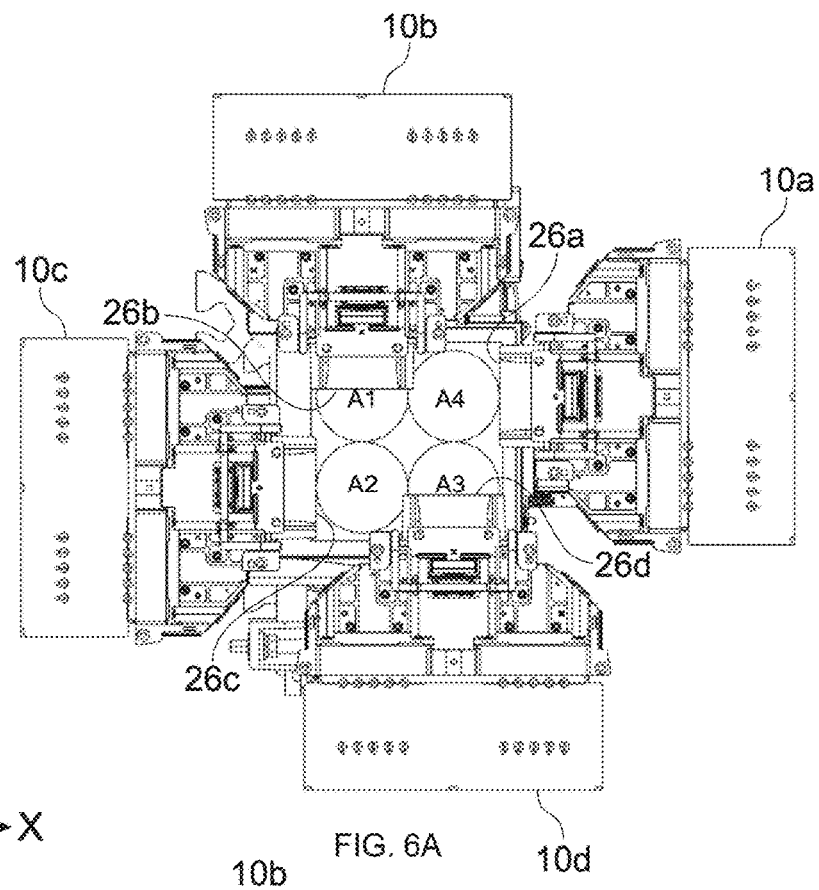
FIGS. 6A and 6B A front view of four light source units as viewed from a direction of a normal of the irradiated surface (y-axis direction).
Figure 6B:
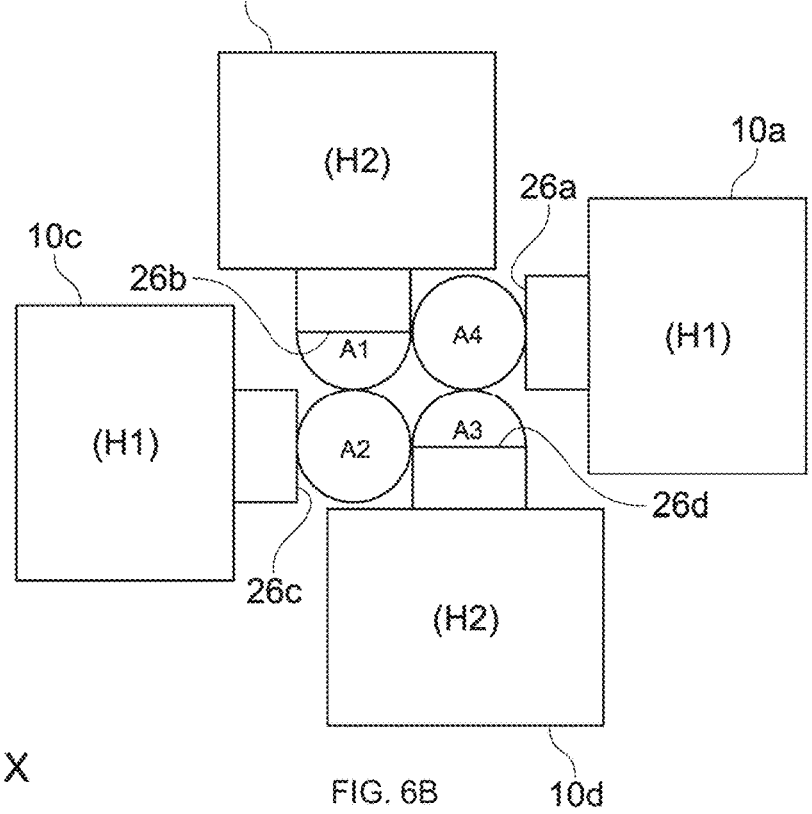
Figure 7A:
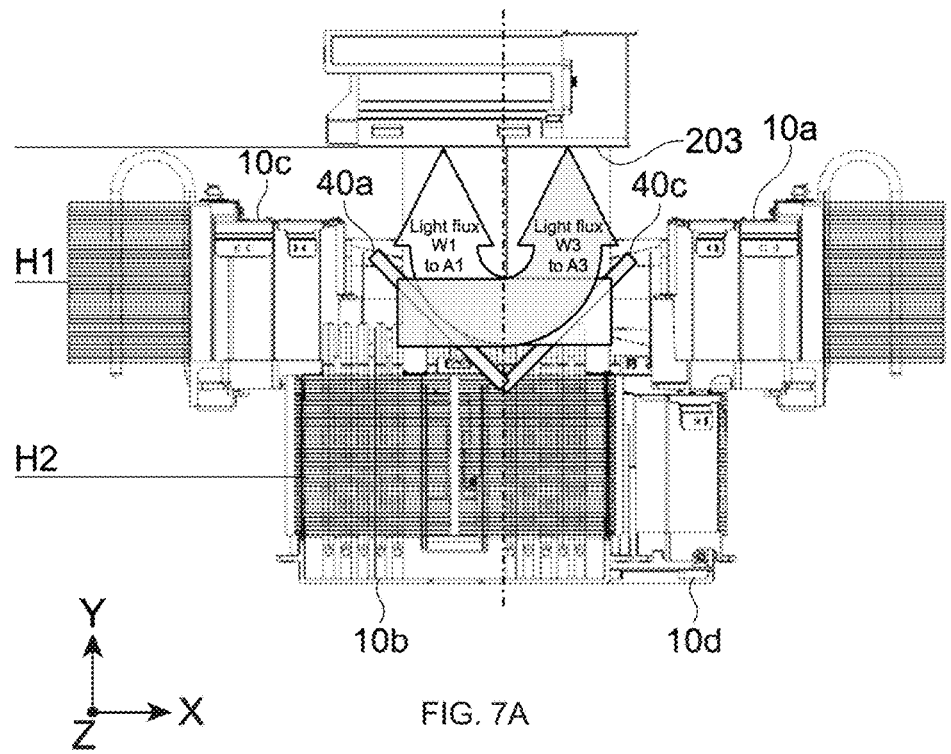
FIGS. 7A and 7B A top view of the four light source units as viewed from the top along a z-axis direction.
Figure 7B:
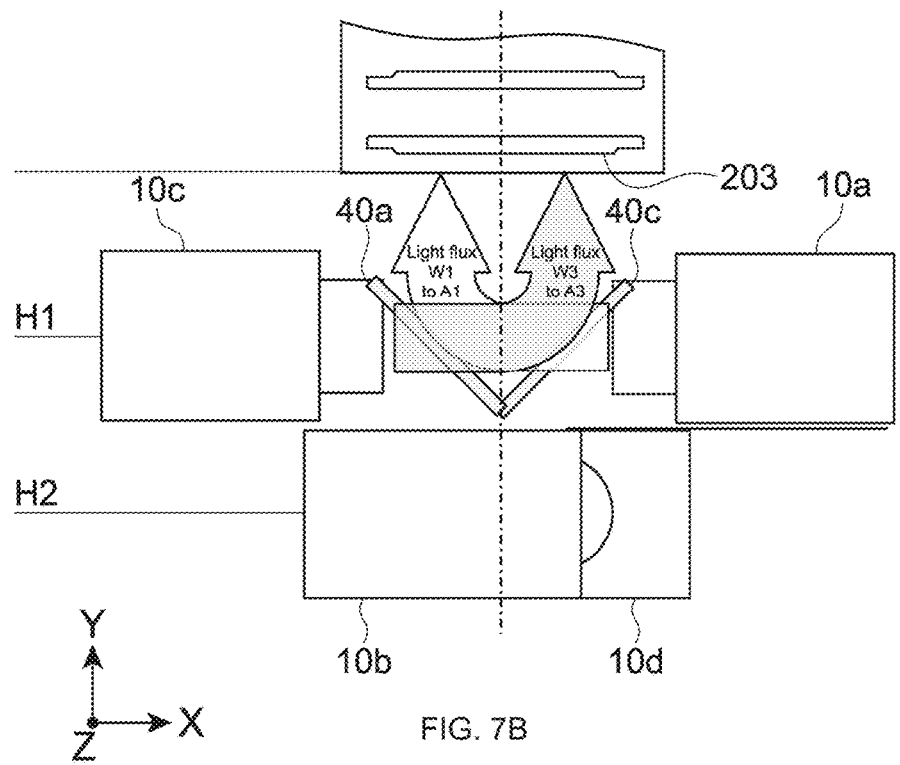
Figure 8A:
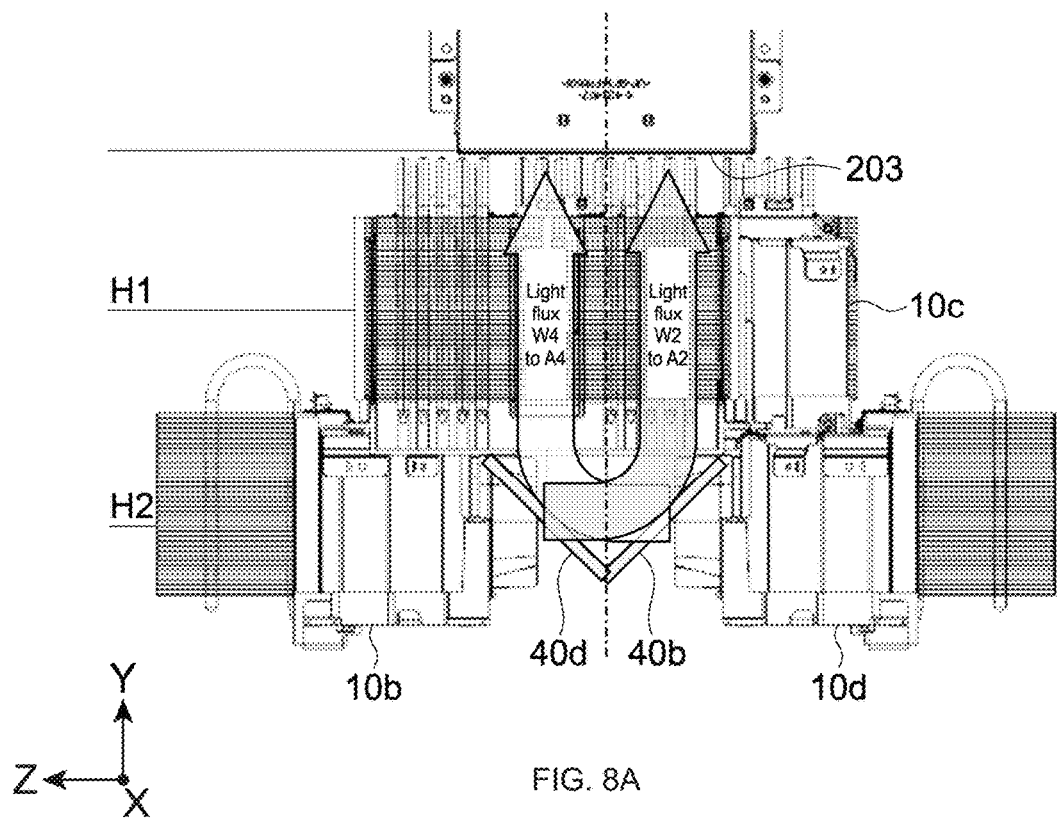
FIGS. 8A and 8B A side view of the four light source units as viewed along an x-axis direction.
Figure 8B:
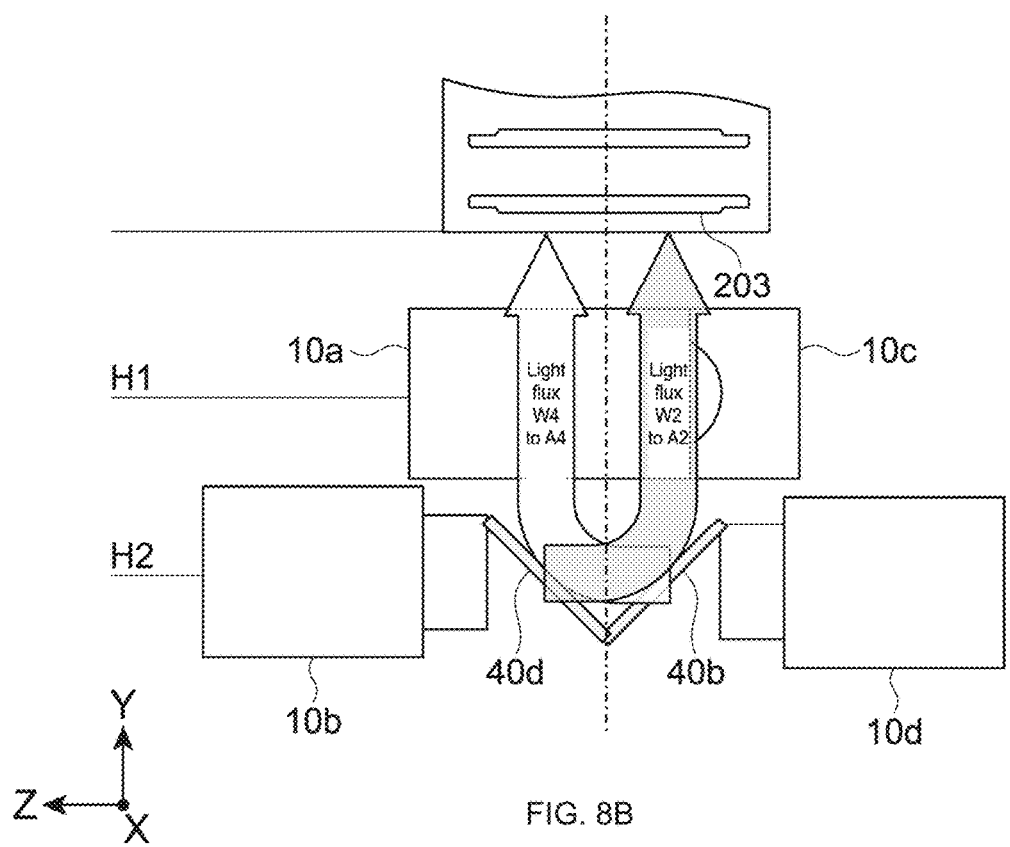

FIGS. 6A and 6B to 8A and 8B are each a schematic diagram showing arrangement of the four light source units 10a to 10d. FIGS. 6A and 6B are front views as viewed from the y-axis direction that is a direction of a normal of the irradiated surface 203. FIGS. 7A and 7B are top views as viewed from the top along the z-axis direction. FIGS. 8A and 8B are side views as viewed from the right side of FIGS. 6A and 6B along the x-axis direction. Part A of each figure is a diagram in which the light source units 10 shown in FIG. 2 and the like are arranged. Part B is a schematic diagram in which the arrangement relationship of each light source unit 10 is simply illustrated.

Figure 9A:
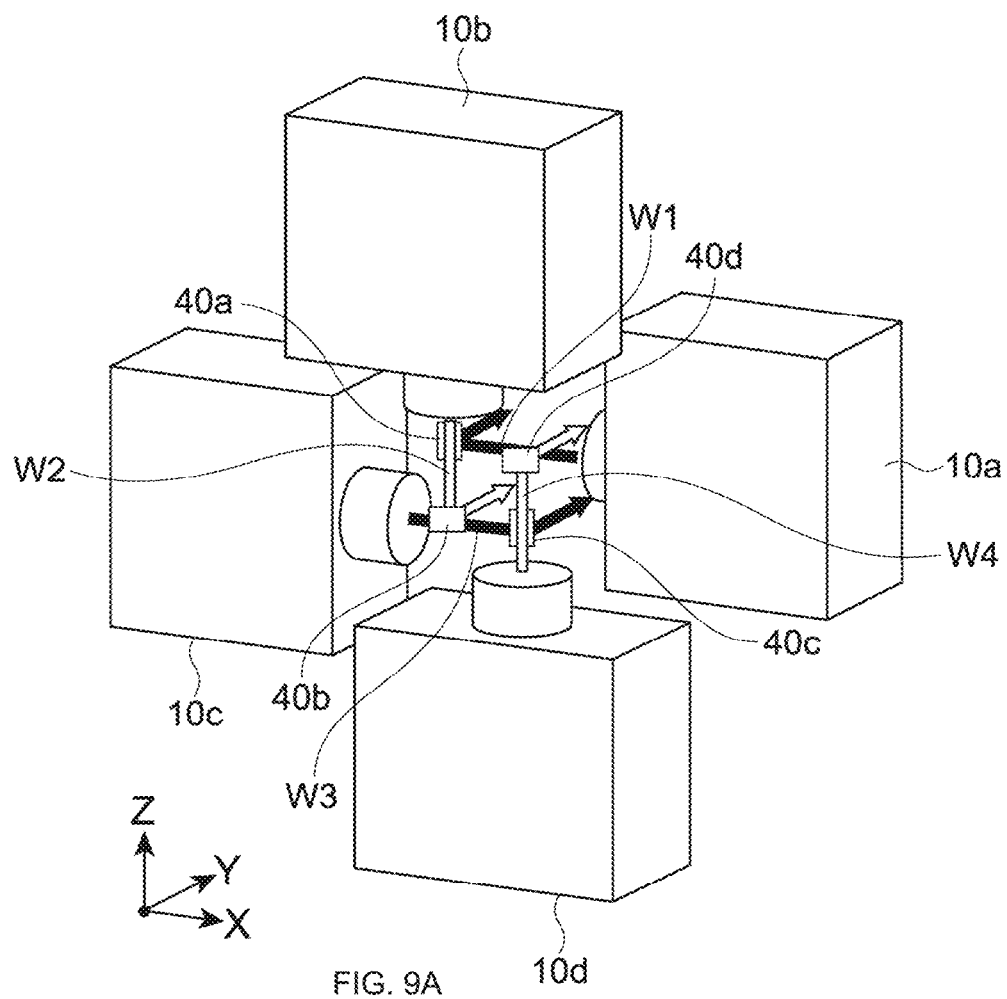
FIGS. 9A and 9B A view for mainly describing a light path of white light emitted from each light source unit.
Figure 9B:
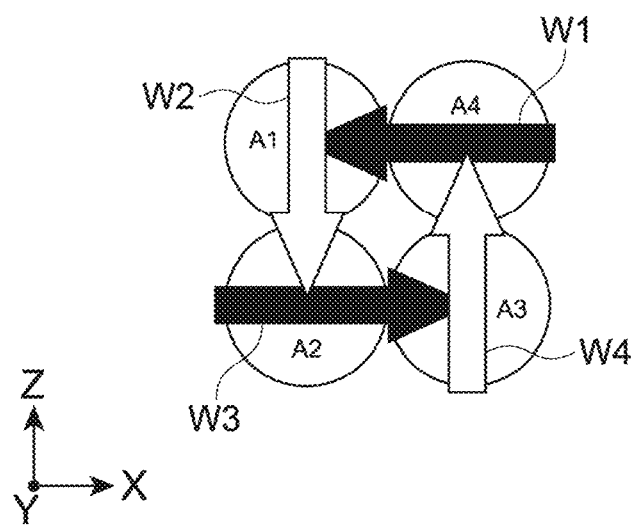

FIGS. 9A and 9B are diagram for mainly describing the optical path of the white lights W1 to W4 emitted from the light source units 10. FIG. 9A is a perspective view schematically showing the four light source units 10a to 10d and the optical path of the white lights W1 to W4. FIG. 9B is a diagram showing the optical path of the white lights W1 to W4 as viewed from the front. Note that in FIG. 9B, the white lights W1 and W3 are illustrated by black arrows and the white lights W2 and W4 are illustrated by white arrows in order to make the figure simple.

Of the four light source units 10a to 10d, the first light source unit 10a corresponds to the first divided area A1, and the second light source unit 10b corresponds to the second divided area A2. Further, the third light source unit 10c corresponds to the third divided area A3, and the fourth light source unit 10d corresponds to the fourth divided area. The white lights W1 to W4 emitted from the light source unit 10a to 10d are respectively emitted to the corresponding divided areas A to A4.

The four light source units 10a to 10d are arranged so that the light emitted therefrom passes through space opposed to at least one different divided area that is different from the divided area to be irradiated with the light. The space opposed to the divided area is space obtained by projecting the divided area in a direction of the normal thereof, and so-called space on the divided area (hereinafter, referred to simply as space on the divided area).

As shown in FIGS. 6A and 6B, the first light source unit 10a is arranged at the right side position of the fourth divided area A4 so that an emission surface 26a faces in the x-axis direction. Further, the third light source unit 10c is arranged at the left side of the second divided area A2 so that an emission surface 26c faces in the x-axis direction.

As shown in FIGS. 9A and 9B, the white light W1 is emitted to the left side along the x-axis direction from the first light source unit 10a. The white light W3 is emitted to the right side along the x-axis direction from the third light source unit 10c. Specifically, the first and third light source units 10a and 10c emit white light in orientations opposed to each other along the x-axis direction.

Further, as shown in FIGS. 7A and 7B, assuming that the y-axis direction that is a direction of a normal of the irradiated surface 203 is a height direction and the irradiated surface 203 is a reference, the first and third light source units 10a and 10c are arranged at positions of a first height H1. At the first height H1, a light flux of the white light W1 travels to the space on the first divided area A1 through space on the fourth divided area A4. Further, the white light W3 travels to space on the third divided area A3 through space on the second divided area A2.

In the space on the first divided area A1, a reflection mirror 40a is arranged. The white light W1 is applied to the first divided area A1 by being reflected by the reflection mirror 40a. On the third divided area A3, a reflection mirror 40c is arranged. The white light W3 is applied to the third divided area A3 by being reflected by the reflection mirror 40c (see also part A of FIG. 9A).

As shown in FIGS. 6A and 6B, the second light source unit 10b is arranged at a position on the upper side of the first divided area A1 so that an emission surface 26b faces in the z-axis direction. Further, the fourth light source unit 10d is arranged at a position on the lower side of the third divided area A3 so that an emission surface 26d faces in the y-axis direction.

As shown in FIGS. 9A and 9B, the white light W2 is emitted to the lower side along the y-axis direction from the second light source unit 10b. The white light W4 is emitted to the upper side along the y-axis direction from the fourth light source unit 10d. Specifically, the second and fourth light source units 10b and 10d emit white light in orientations opposed to each other along the y-axis direction.

Further, as shown in FIGS. 8A and 8B, the second and fourth light source units 10b and 10d are arranged at positions of a second height H2 higher than the first height. At the second height H2, a light flux of the white light W2 travels to the space on the second divided area A2 through the space on the first divided area A1. Further, the white light W4 travels to the space on the fourth divided area A4 through the space on the third divided area A3.

In the space on the second divided area A2 and the space on the fourth divided area A4, reflection mirrors 40b and 40d are arranged, respectively. The white light W2 is applied to the second divided area A2 by being reflected by the reflection mirror 40b. The white light W4 is applied to the fourth divided area A4 by being reflected by the reflection mirror 40d.

As shown in FIG. 9A, a light flux of the white light W1 from the first light source unit 10a and a light flux of the white light W4 from the fourth light source unit 10d intersect with each other. Further, a light flux of the white light W3 from the third light source unit 10c and a light flux of the white light W2 from the second light source unit 10b intersect with each other.

The reflection mirrors 40a to 40d shown in FIGS. 7A and 7B and FIGS. 8A and 8B function as light guiding optical systems that guide white light that passes through space on a different divided area from each of a plurality of light source units into a divided area to be irradiated with the light in this embodiment. The configuration of the light guiding optical system is not limited, and another optical member may be used instead of the four reflection mirrors 40a to 40d or in addition to the four reflection mirrors 40a to 40d.

By arranging the light source units 10 not at positions very close to the divided area to be irradiated with the light but so that the emitted light passes through the space on a different divided area as described above, it is possible to arrange the four light source units 10a to 10d to come close to each other in an xz plane direction (surface direction of the irradiated surface 203). For example, the first light source unit 10a can be arranged to be as close to the fourth divided area A4 as possible within the range in which irradiation of the white light W4 onto the divided area A4 is not blocked. Similarly, also the third light source unit 10c can be arranged to be as close to the second divided area A2 as possible within the range in which irradiation of the white light W2 onto the divided area A2 is not blocked.

As shown in FIGS. 6A and 6B, the second light source unit 10b can be arranged so that the emission surface 26b is included in the space on the first divided area A1. Similarly, the fourth light source unit 10d can be arranged so that the emission surface 26d is included in the space on the third divided area A3.

Specifically, the second light source unit 10b can be arranged so that the emission surface 26b of the second light source unit 10b overlaps with the first divided area A1 as viewed from the y-axis direction. Similarly, the fourth light source unit 10d can be arranged so that the emission surface 26d of the fourth light source unit 10d overlaps with the third divided area A3. Accordingly, it is possible to reduce the size of the multi-lamp light source system 100 in which the plurality of light source units 10 are multi-arranged, and achieve the size reduction of the image display apparatus 500.

A light flux of the white light W1 and a light flux of the white light W4 intersect with each other and a light flux of the white light W3 and a light flux of the white light W2 intersect with each other, which are very advantageous in reducing the size of the light source system 100 and the image display apparatus 500.

Further, because the laser light source 17 is used in this embodiment, it is possible to achieve the tilt-free image display apparatus 500. Further, also the orientation of arrangement of the light source units 10 can be appropriately set in accordance with the shape of the image display apparatus 500, the orientation where the size is desired to be reduced, and the like.

For example, in the example shown in FIGS. 6A and 6B and the like, the light source units 10 are arranged in an orientation where the base portion 13 shown in FIG. 2 is in parallel with the surface direction of the irradiated surface 203. However, it is not limited thereto, and it is also possible to arrange the light source units 10 to be rotated around an optical axis at a predetermined angle. For example, it is also possible to arrange the light source units 10 in the vertical orientation so that the longitudinal direction of the base portion 13 corresponds to the y-axis direction in FIGS. 6A and 6B. The arrangement angle may be individually set in each light source unit 10.

In the case where a xenon lamp, halogen lamp, or the like is used as the light source, the orientation where the lamp should be used is limited due to the characteristics of a reflector, burner, or the like in some cases. In the case where such a light source is used to configure a multi-lamp light source system, it is very difficult to achieve tilt-free. Meanwhile, in the case where the laser light source 17 is used as in this embodiment, it is possible to exert the above-mentioned effects. The same applies to the case where another solid-state light source such as an LED is used instead of the laser light source 17.

The four light source units 10a to 10d are fixed to a predetermined holding member (not shown) in the image display apparatus 500. A single holding member that holds all the four optical units 10a to 10d may be used, or the light source units 10 may be separately held by a different holding member or the like.

Further, the light source system 100 may be configured as an independent light source apparatus. For example, the four light source units are arranged in an enclosure constituting a light source apparatus in the positional relationship shown in FIGS. 6A and 6B and the like. A light guiding optical system and an emission port are provided in the enclosure, and a plurality of light fluxes are emitted from the emission port with a plurality of divided areas as irradiation targets. Accordingly, it is possible to achieve a multi-lamp small-sized light source apparatus.

OTHER EMBODIMENTS

The present technology is not limited to the above-mentioned embodiments and various other embodiments can be realized.

Figure 10:
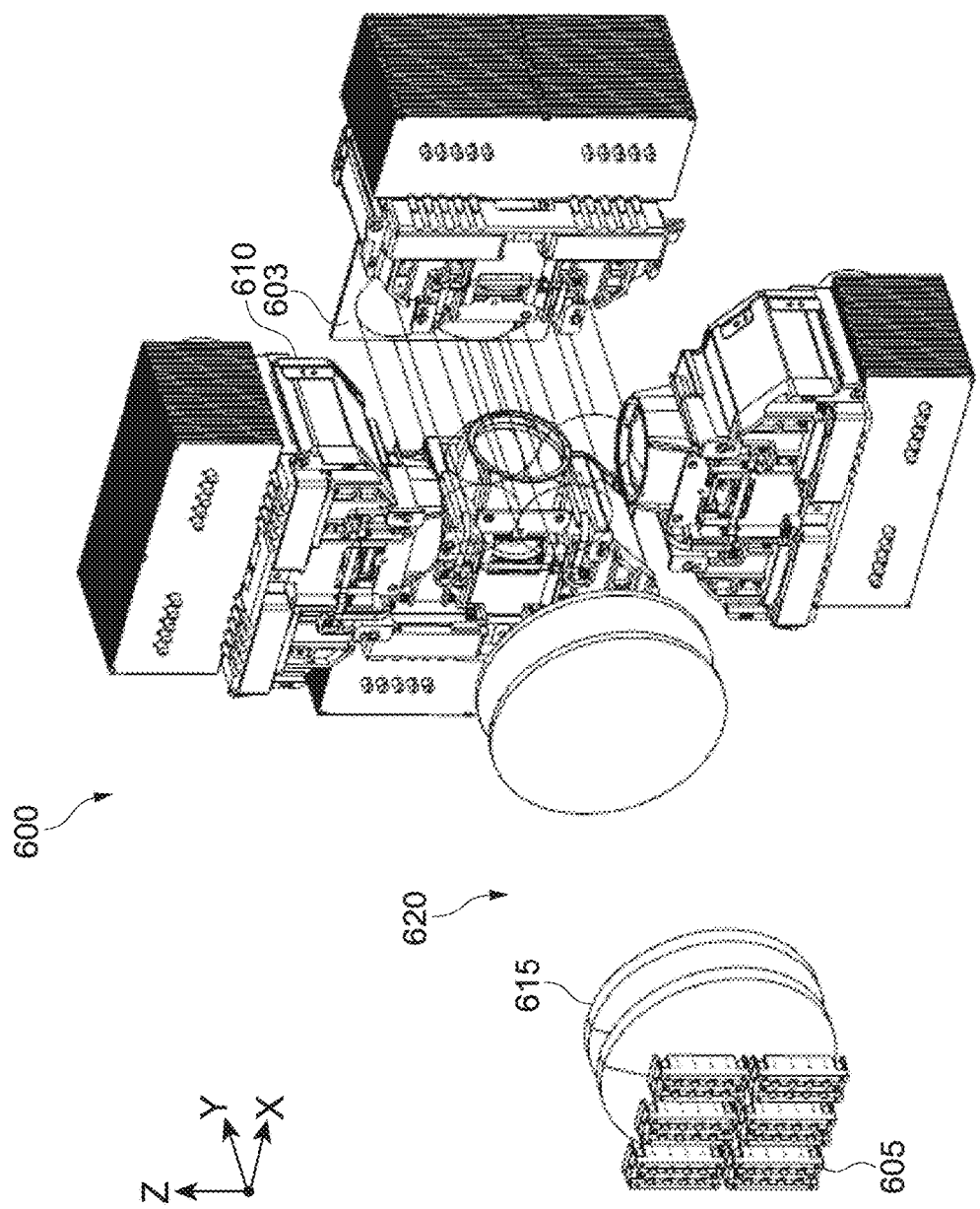
FIG. 10 A perspective view showing a configuration example of a light source system according to another embodiment.
Figure 11:
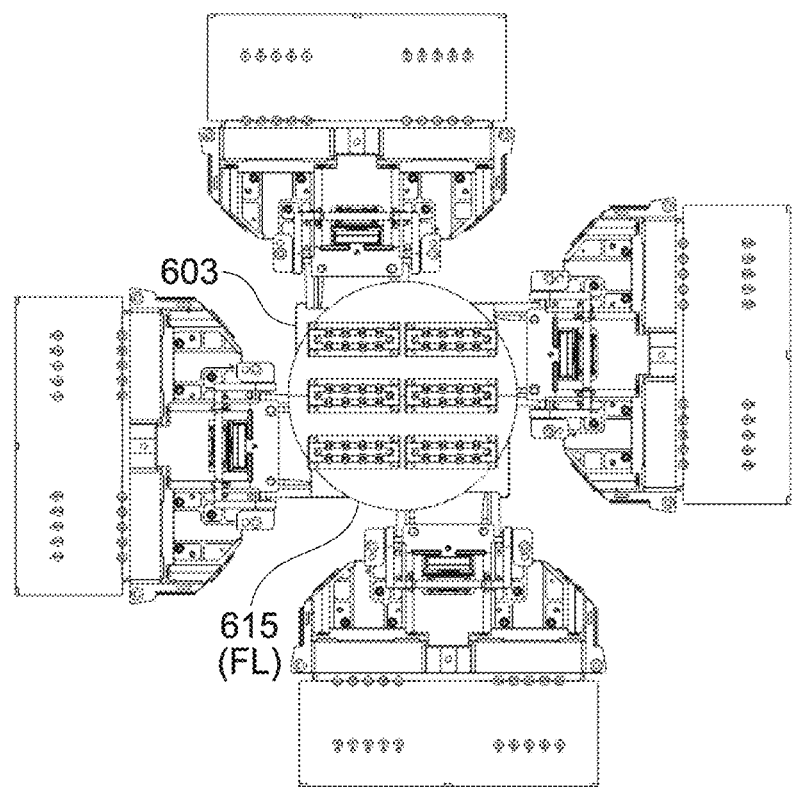
FIG. 11 A front view of the light source system shown in FIG. 10.
Figure 11:
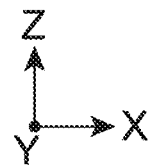
Figure 12:
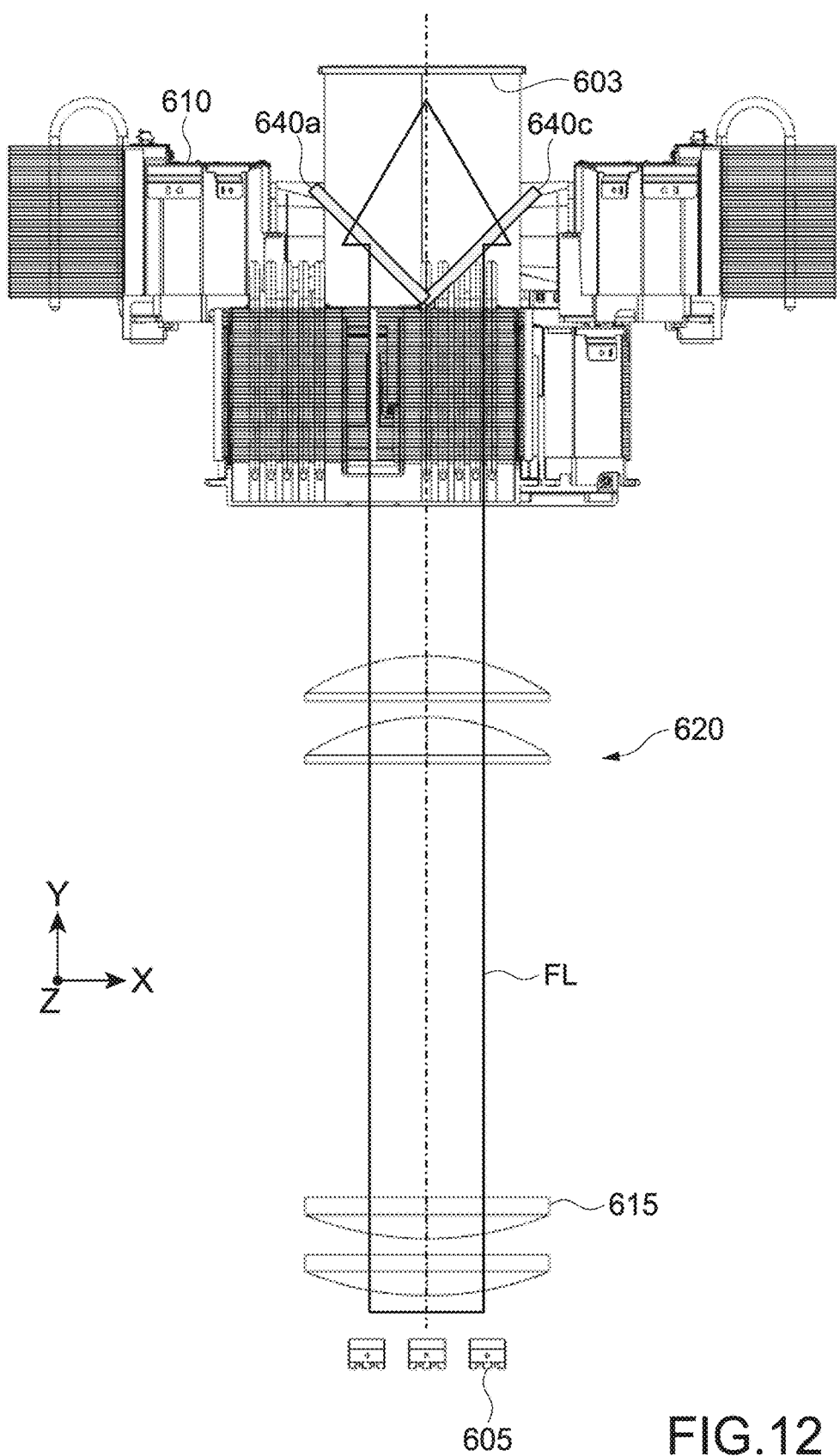
FIG. 12 A top view of the light source system shown in FIG. 10.
Figure 13:
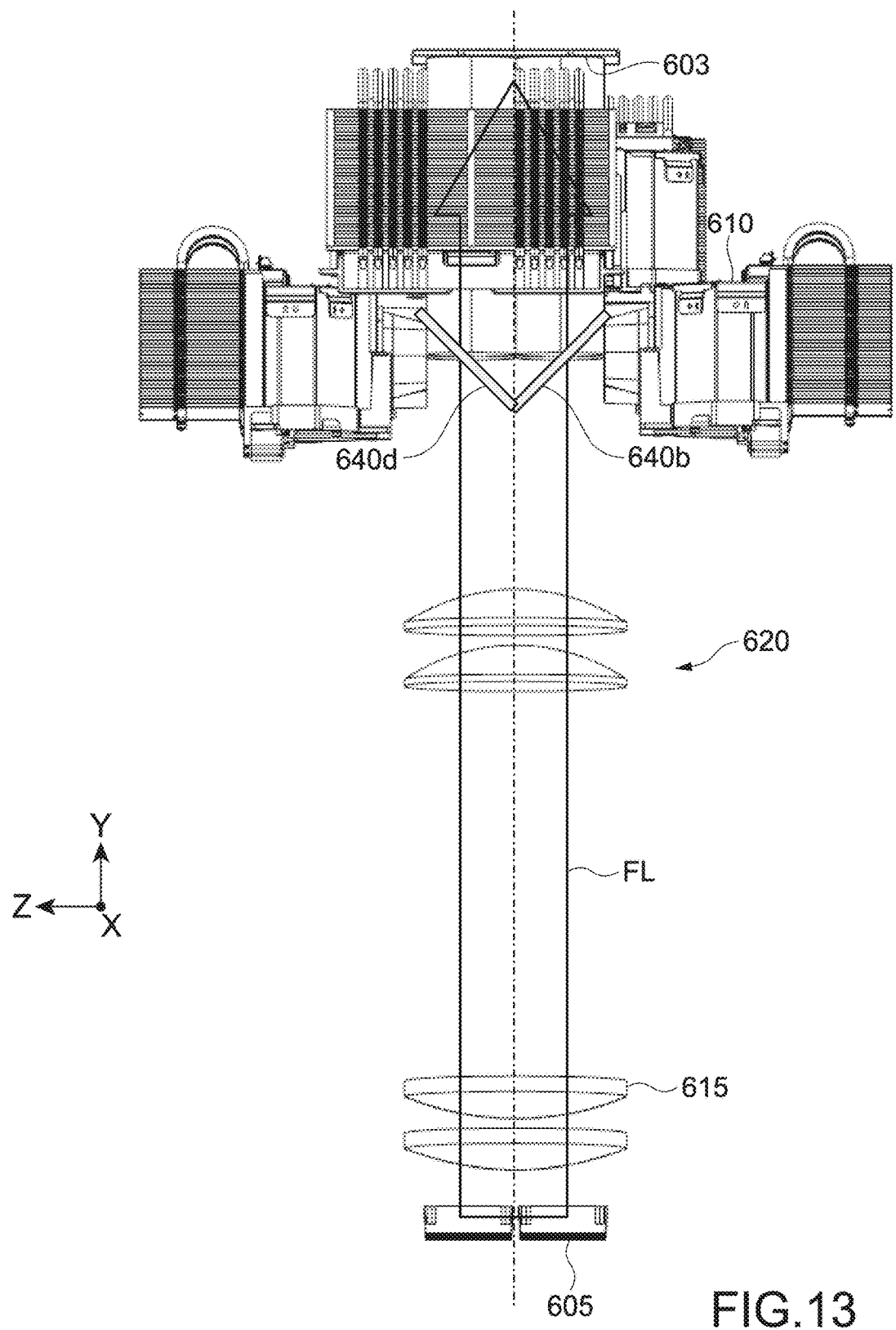
FIG. 13 A side view of the light source system shown in FIG. 10.

FIGS. 10 to 13 are each a schematic diagram showing a configuration example of a light source system according to another embodiment. FIG. 10 is a perspective view, and FIG. 11 is a front view. Further, FIG. 12 is a top view, and FIG. 13 is a side view. Note that in FIG. 10, a light flux of white light applied to each divided area is schematically illustrated.

This light source system 600 includes an auxiliary light source 605 that emits light of a predetermined color as auxiliary light FL. In this embodiment, as the auxiliary light source 605, a plurality of blue-laser light sources that emit blue laser light are used. The specific configuration of the auxiliary light source 605 and the color of the auxiliary light FL are not limited. For example, the same light source as the laser light source 17 of the light source unit 10 shown in FIG. 3 may be used as the auxiliary light source 605. Alternatively, a different laser light source may be used.

As shown in FIGS. 10 to 13, the auxiliary light source 605 is arranged at a position opposed to an irradiated surface 603, and emits the auxiliary light FL to the irradiated surface 603 along the y-axis direction. A light collection optical system 620 including a plurality of lenses 615 is arranged between the auxiliary light source 605 and the irradiated surface 603, and the auxiliary light FL is applied to the irradiated surface 603 via the light collection optical system 620. The configuration of the light collection optical system 620 is not limited.

As shown in FIG. 11, in this embodiment, the auxiliary light FL having a light flux with a size that covers the entire irradiated surface 603 is applied. Specifically, not a plurality of divided light fluxes but a single light flux is applied to the irradiated surface 603. Therefore, it is possible to apply the auxiliary light FL to the irradiated surface 603 with a simple configuration. Note that the auxiliary light FL may be divided into a plurality of light fluxes and the plurality of light fluxes may be applied to the respective divided areas.

As the light guiding optical system shown in FIG. 12 and FIG. 13, dichroic mirrors 640a to 650d that transmit blue laser light that is the auxiliary light FL therethrough are arranged instead of the reflection mirrors 40a to 40d shown in FIGS. 7A and 7B and FIGS. 8A and 8B. Therefore, the auxiliary light FL is transmitted through the dichroic mirrors 640a to 640d, and applied to the irradiated surface 603.

By providing the auxiliary light source 605 as described above, it is possible to supplement the insufficiency of light of a predetermined color (blue light in this embodiment), and display a brighter image. Further, it is possible to adjust the range (gamut) in which the color can be reproduced, and display a color image with a high quality. Note that the number, output power, and the like of auxiliary light sources 605 may be appropriately set depending on the purposes.

In this configuration, as each light source unit 610, a light source that emits only yellow light generated from a phosphor layer may be arranged. Then, as a light source for blue light, a blue-laser light source may be separately and independently arranged at the position of the auxiliary light source 605 shown in FIGS. 10 to 13. In this case, white light is generated by yellow light reflected by the dichroic mirrors 640a to 640d and blue laser light that is transmitted through the dichroic mirrors 640a to 640d. By independently arranging a light source for blue light, it is possible to easily adjust the blue light and increase the luminance and quality of an image.

Figure 14A:
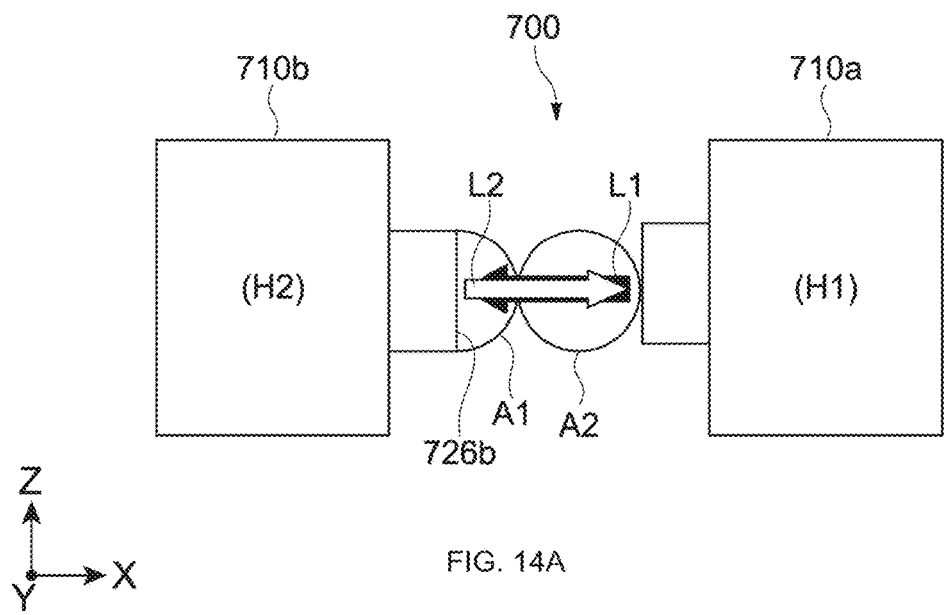
FIGS. 14A and 14B A perspective view showing a configuration example of a light source system according to another embodiment.
Figure 14B:
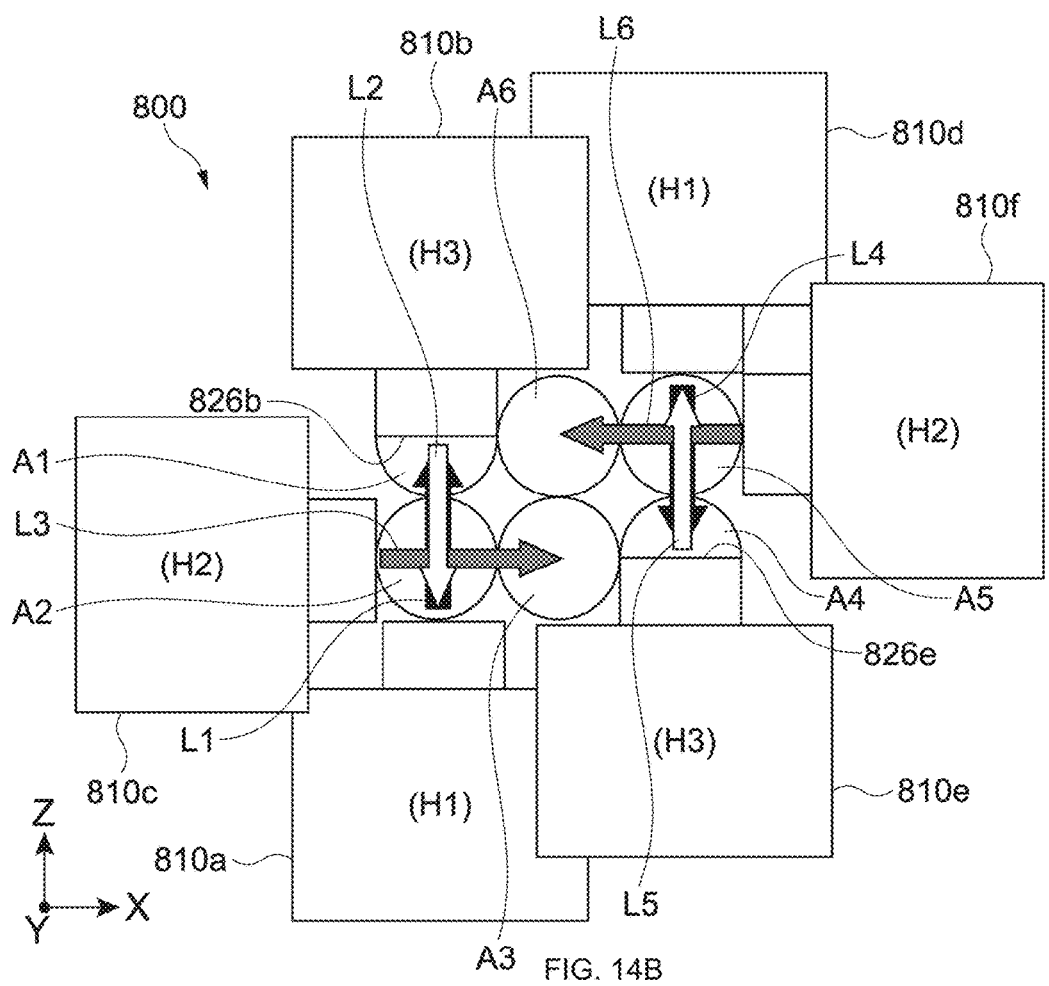

FIGS. 14A and 14B are schematic diagram showing a configuration example of a light source system according to another embodiment. In a light source system 700 shown in FIG. 14A, two light source units 710a and 710b are provided corresponding to the two divided areas A1 and A2.

The first light source unit 710a is arranged at the first height H1 so that emitted light L1 passes through the space on the second divided area A2. The second light source unit 710b is arranged at the second height H2 higher than the first height H1 so that emitted light L2 passes through the space on the first divided area A1. The second light source unit 710b is arranged so that an emission surface 726b is included in the space on the first divided area A1. Accordingly, it is possible to achieve the size reduction of the light source system 700.

In a light source system 800 shown in FIG. 14B, six light source units are arranged corresponding to six divided areas. The six divided areas include three divided areas arranged in the x-axis direction and two divided areas arranged in the z-axis direction constituting first to sixth divided areas A1 to A6. In the following configuration, first to sixth light source units 810a to 810f are arranged corresponding to the first to sixth divided areas A1 to A6. Note that heights at which the light source units 810 are arranged are the first height H1, the second height H2, and a third height H3 in the increasing order.

The first light source unit 810a is arranged at the first height H1 so that the emitted light L1 passes through the space on the second divided area A2 along the z-axis direction.

The second light source unit 810b is arranged at the third height H3 so that the emitted light L2 passes through the space on the first divided area A1 along the z-axis direction.

The third light source unit 810c is arranged at the second height H2 so that emitted light L3 passes through the space on the second divided area A2 along the x-axis direction.

The fourth light source unit 810d is arranged at the first height H1 so that emitted light L4 passes through the space on the fifth divided area A5 along the z-axis direction.

The fifth light source unit 810e is arranged at the third height H3 so that emitted light L5 passes through the space on the fourth divided area A4 along the z-axis direction.

The sixth light source unit 810f is arranged at the second height H2 so that emitted light L6 passes through the space on the fifth divided area A5 along the x-axis direction.

As shown in FIG. 14B, the second light source unit 810b can be arranged so that an emission surface 826b is included in the space on the first divided area A1. Further, the fifth light source unit 810e can be arranged so that an emission surface 826e is included in the space on the fourth divided area A4. As a result, it is possible to achieve the size reduction of the light source system 800 that combines six lamps with each other. In addition, in the case where light source units corresponding to an arbitrary number of divided areas are used, the present technology is applicable.

In the image display apparatus 500 shown in FIG. 1, a reflective liquid-crystal panel has been used as the image generation element. This may be rearranged by a transmissive liquid-crystal panel, a digital micromirror device (DMD), or the like. In addition, the configuration of the image display apparatus may be appropriately set.

The present technology is applicable also to another image display apparatus such as a display apparatus other than a projector. Further, the light source apparatus according to the present technology may be used in an apparatus different from the image display apparatus.

At least two feature parts of the feature parts of the above-mentioned embodiments can also be combined. That is, the various feature parts described in the embodiments may be arbitrarily combined without distinction of the embodiments. Further, the various effect described above are merely an example and not limited, and another effect may be exerted.

Note that the present technology may also take the following configurations.

(1) An image display apparatus, including:
an image generation system that includes an image generation element and an illumination optical system, the image generation element generating an image on the basis of incident light, the illumination optical system having an irradiated surface and guiding light applied to the irradiated surface into the image generation element, the irradiated surface including a plurality of divided areas; and
a light source system that includes a plurality of light source units corresponding to the plurality of divided areas, and a light guiding optical system, the plurality of light source units emitting emitted light to corresponding divided areas, the light guiding optical system guiding the emitted light into a divided area to be irradiated with the emitted light, in which
at least one of the plurality of light source units is arranged so that the emitted light passes through space opposed to at least one different divided area, the at least one different divided area being different from the divided area to be irradiated with the emitted light.

(2) The image display apparatus according to (1), in which
the light guiding optical system guides emitted light that is emitted from the at least one of the plurality of light source units and passes through the space opposed to the at least one different divided area into the divided area to be irradiated with the emitted light.

(3) The image display apparatus according to (1) or (2), in which
the plurality of light source units each have an emission surface, the emitted light being emitted from the emission surface, and
the at least one of the plurality of light source units is arranged so that the emission surface is included in the space opposed to the at least one different divided area.

(4) The image display apparatus according to any one of (1) to (3), in which
the plurality of light source units include one or more light source units arranged at a first height and one or more light source units arranged at a second height different from the first height, a direction of a normal of the irradiated surface being a height direction.

(5) The image display apparatus according to any one of (1) to (4), in which
the at least one of the plurality of light source units is arranged so that emitted light of the at least one of the plurality of light source units intersects with emitted light of a different light source unit of the plurality of light source units.

(6) The image display apparatus according to (4) or (5), in which
the plurality of divided areas include four divided areas arranged along a first direction and a second direction orthogonal to the first direction around a predetermined point on the irradiated surface, and
the plurality of light source units include two light source units arranged at the first height and two light source units arranged at the second height, the two light source units arranged at the first height emitting the emitted light in orientations opposed to each other along the first direction, the two light source units arranged at the second height emitting the emitted light in orientations opposed to each other along the second direction.

(7) The image display apparatus according to (6), in which
the four divided areas include a first divided area, a second divided area adjacent to the first divided area in the second direction, a third divided area adjacent to the second divided area in the first direction, and a fourth divided area adjacent to the third divided area in the second direction and to the first divided area in the first direction,
the two light source units arranged at the first height include a first light source unit and a third light source unit, the first light source unit being arranged so that the emitted light passes through space opposed to the fourth divided area, the third light source unit being arranged so that the emitted light passes through space opposed to the second divided area, and
the two light source units arranged at the second height include a second light source unit and a fourth light source unit, the second light source unit being arranged so that the emitted light passes through space opposed to the first divided area, the fourth light source unit being arranged so that the emitted light passes through space opposed to the third divided area.

(8) The image display apparatus according to (7), in which
the second height is higher than the first height,
the second light source unit is arranged so that the emission surface is included in the space opposed to the first divided area, and
the fourth light source unit is arranged so that the emission surface is included in the space opposed to the third divided area.

(9) The image display apparatus according to any one of (1) to (8), in which
the light source system includes an auxiliary light source that emits light of a predetermined color as auxiliary light, and
the light guiding optical system guides the auxiliary light from the auxiliary light source into the irradiated surface.

(10) The image display apparatus according to any one of (1) to (9), in which
the irradiated surface is an incident surface of a fly eye lens of the illumination optical system.

(11) The image display apparatus according to any one of (1) to (10, in which
the plurality of light source units each include one or more laser light sources.

REFERENCE SIGNS LIST

A1 to A4 first to fourth divided area
H1 first height
H2 second height
P point
FL auxiliary light
W, W1 to W4 white light
10a to 10d first to fourth light source unit
17 laser light source (laser diode)
26 emission surface
40a to 40d reflection mirror
100, 600, 700, 800 light source system
200 image generation system
201 liquid-crystal light bulb
202 illumination optical system
203 irradiated surface
205a first fly eye lens
500 image display apparatus
605 auxiliary light source
610 light source unit
640a to 640d dichroic mirror

The invention claimed is:
1. An image display apparatus, comprising:
an image generation system that includes:
  an image generation element configured to generate an image based on incident light rays; and
  an illumination optical system with an irradiated surface that includes a plurality of divided areas,
    wherein the illumination optical system is configured to guide the incident light rays to the image generation element, and
    wherein the incident light rays comprise corresponding light ray emitted from each of a plurality of light source units; and
a light source system that includes:
  the plurality of light source units,
    wherein each of the plurality of light source units has a positional relationship with a corresponding divided area of the plurality of divided areas, and
    wherein each of the plurality of light source units is configured to emit the corresponding light ray onto the corresponding divided area of the plurality of divided areas; and
  a light guiding optical system configured to guide the emitted corresponding light ray onto the corresponding divided area of the plurality of divided areas,
    wherein a first light source unit of the plurality of light source units is arranged such that the first light source unit emits a first light ray onto a first divided area of the plurality of divided areas,
    wherein a second light source unit of the plurality of light source units is arranged such that a second light ray emitted from the second light source unit is passed through a first space that is opposite to the first divided area of the plurality of divided areas, and
    wherein a first emission surface of the first light source unit is perpendicular to a second emission surface of the second light source unit.

2. The image display apparatus according to claim 1, wherein the light guiding optical system is further configured to guide the first light ray towards the first divided area, and
wherein the guided first light ray irradiates the first divided area.

3. The image display apparatus according to claim 1,
wherein each of the plurality of light source units has a emission surface to emit the corresponding light ray.

4. The image display apparatus according to claim 1,
wherein the first light source unit is at a first height in a perpendicular direction from the irradiated surface,
wherein the second light source unit of the plurality of light source units is at a second height in the perpendicular direction from the irradiated surface, and
wherein the second height is different from the first height.

5. The image display apparatus according to claim 1, wherein
the first light source unit of the plurality of light source units is arranged such that the emitted first light ray of the first light source unit intersects with the second light ray emitted from the second light source unit of the plurality of light source units.

6. The image display apparatus according to claim 4,
wherein the plurality of divided areas include four divided areas arranged in a first direction and a second direction,
wherein the four divided areas are arranged around a first point on the irradiated surface,
wherein the second direction is orthogonal to the first direction,
wherein the first light source unit and a third light source unit of the plurality of light source units are arranged at the first height,
wherein the first light source unit is in a first orientation which is opposite to a second orientation of the third light source unit,
wherein the second light source unit and a fourth light source unit of the plurality of light source units are arranged at the second height, and
wherein the second light source unit is in a third orientation which is opposite to a fourth orientation of the fourth light source unit.

7. The image display apparatus according to claim 6,
wherein the four divided areas include the first divided area, a second divided area, a third divided area, and a fourth divided area,
wherein the second divided area is adjacent to the first divided area in the second direction,
wherein the third divided area is adjacent to the second divided area in the first direction,
wherein the fourth divided area is adjacent to the third divided area in the second direction and the first divided area is further adjacent to the fourth divided area in the first direction,
wherein the first light ray emitted from the first light source unit is passed through a fourth space that is opposite to the fourth divided area,
wherein a third light ray emitted from the third light source unit is passed through a second space that is opposite to the second divided area, and
wherein a fourth light ray emitted from the fourth light source unit passes through a third space that is opposite to the third divided area.

8. The image display apparatus according to claim 7, wherein the second height is higher than the first height.

9. The image display apparatus according to claim 1,
wherein the light source system further includes an auxiliary light source configured to emit an auxiliary light of a first color, and
wherein the light guiding optical system is further configured to guide the auxiliary light from the auxiliary light source onto the irradiated surface.

10. The image display apparatus according to claim 1, wherein
the irradiated surface is an incident surface of a fly eye lens of the illumination optical system.

11. The image display apparatus according to claim 1, wherein
each of the plurality of light source units includes at least one laser light source.

12. A light source apparatus, comprising:
a plurality of light source units corresponding to a plurality of divided areas,
wherein each of the plurality of light source units has a positional relationship with a corresponding divided area of the plurality of divided areas,
wherein a first light source unit of the plurality of light source units is arranged such that the first light source unit emits a first light ray onto a first divided area of the plurality of divided areas,
wherein a second light source unit of the plurality of light source units is arranged such that a second light ray emitted from the second light source unit is passed through a space that is opposite to the first divided area of the plurality of divided areas, and
wherein a first emission surface of the first light source unit is perpendicular to a second emission surface of the second light source unit; and
a light guiding optical system configured to guide corresponding light ray emitted from each of the plurality of light source units onto the corresponding divided area of the plurality of divided areas.

13. An image display method, comprising:
in an image display apparatus:
arranging a plurality of light source apparatuses corresponding to a plurality of divided areas of an irradiated surface,
wherein each of the plurality of light source apparatuses has a positional relationship with a corresponding divided area of the plurality of divided areas, and
wherein each of the plurality of light source apparatuses is configured to emit corresponding light ray onto the corresponding divided area of the plurality of divided areas;
guiding, by a light guiding optical system, the corresponding light ray emitted from each of the plurality of light source apparatuses,
wherein a first light source apparatus of the plurality of light source apparatuses is arranged such that the first light source apparatus emits a first light ray onto a first divided area of the plurality of divided areas,
wherein a second light source apparatus of the plurality of light source apparatuses is arranged such that a second light ray emitted from the second light source apparatus is passed through a space that is opposite to the first divided area of the plurality of divided areas, and
wherein a first emission surface of the first light source apparatus is perpendicular to a second emission surface of the second light source apparatus;
guiding, by an illumination optical system, the corresponding light ray emitted from each of the plurality of light source apparatuses corresponding to each of the plurality of divided areas onto an image generation element; and generating an image, by the image generation element, based on the guided corresponding light ray emitted from each of the plurality of light source apparatuses.

* * * * *